(12) United States Patent
Horiguchi et al.

(10) Patent No.: US 12,249,352 B2
(45) Date of Patent: Mar. 11, 2025

(54) DISK DEVICE

(71) Applicants: Kabushiki Kaisha Toshiba, Tokyo (JP); Toshiba Electronic Devices & Storage Corporation, Tokyo (JP)

(72) Inventors: Yutaka Horiguchi, Yokohama Kanagawa (JP); Osamu Yoshida, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 105 days.

(21) Appl. No.: 18/119,638

(22) Filed: Mar. 9, 2023

(65) Prior Publication Data

US 2024/0096376 A1 Mar. 21, 2024

(30) Foreign Application Priority Data

Sep. 21, 2022 (JP) ................. 2022-150515

(51) Int. Cl.
 *G11B 27/36* (2006.01)
 *G11B 19/20* (2006.01)
(52) U.S. Cl.
 CPC .......... *G11B 27/36* (2013.01); *G11B 19/2054* (2013.01); *G11B 19/2063* (2013.01)

(58) Field of Classification Search
 CPC .. G11B 27/36; G11B 19/2054; G11B 19/2063
 See application file for complete search history.

(56) References Cited

U.S. PATENT DOCUMENTS

| | | | |
|---|---|---|---|
| 7,222,267 B2 | 5/2007 | Jeong | |
| 2005/0092727 A1* | 5/2005 | Fraley | ................. G11B 33/128 |
| 2006/0236161 A1* | 10/2006 | Tanaka | ................. G06F 11/004 |
| 2010/0182158 A1* | 7/2010 | Borghetti | ............... G11B 27/36 |
| | | | 340/669 |
| 2016/0188216 A1 | 6/2016 | Bi et al. | |

FOREIGN PATENT DOCUMENTS

JP H11-24845 A 1/1999

* cited by examiner

*Primary Examiner* — Andrew Sasinowski
(74) *Attorney, Agent, or Firm* — Maier & Maier, PLLC (57) ABSTRACT

According to one embodiment, there is provided a disk device including a first connector, a second connector and a controller. The first connector is connectable to a host. The first connector includes a first pin that is electrically connectable to a light emitting device in the host. The second connector is connectable to the host. The second connector includes a second pin that is receivable with data from the host. The controller is communicable with predetermined information with the host via the first pin.

20 Claims, 5 Drawing Sheets

| PIN NUMBER | FUNCTION |
|---|---|
| P1 | VDD1 |
| P2 | VDD1 |
| P3 | VDD1 |
| P4 | GND |
| P5 | GND |
| P6 | GND |
| P7 | VDD2 |
| P8 | VDD2 |
| P9 | VDD2 |
| P10 | GND |
| P11 | LCTR/SCTR |
| P12 | GND |
| P13 | VDD3 |
| P14 | VDD3 |
| P15 | VDD3 |

FIG.3B

| PIN NUMBER | FUNCTION |
|---|---|
| P101 | GND |
| P102 | TX+ |
| P103 | TX- |
| P104 | GND |
| P105 | RX- |
| P106 | RX+ |
| P107 | GND |

DISK DEVICE

CROSS-REFERENCE TO RELATED APPLICATIONS

This application claims the benefit of Japanese Patent Application No. 2022-150515, filed on Sep. 21, 2022; the entire contents of which are incorporated herein by reference.

FIELD

Embodiments described herein relate generally to a disk device.

BACKGROUND

In a disk device including a controller, the controller sometimes transmits information regarding a state of the disk device, to a host. At this time, it is desired to efficiently notify the host of information regarding the state of the disk device.

DETAILED DESCRIPTION

In general, according to one embodiment, there is provided a disk device including a first connector, a second connector and a controller. The first connector is connectable to a host. The first connector includes a first pin that is electrically connectable to a light emitting device in the host. The second connector is connectable to a host. The second connector includes a second pin that is receivable with data from the host. The controller is communicable with predetermined information with the host via the first pin.

Exemplary embodiments of a disk device will be explained below in detail with reference to the accompanying drawings. The present invention is not limited to the following embodiments.

Embodiment

A disk device according to an embodiment includes a controller, and the controller notifies a host of information regarding the state of the disk device. A contrivance for efficiently notifying the host of information regarding the state of the disk device is applied.

Figure 1:
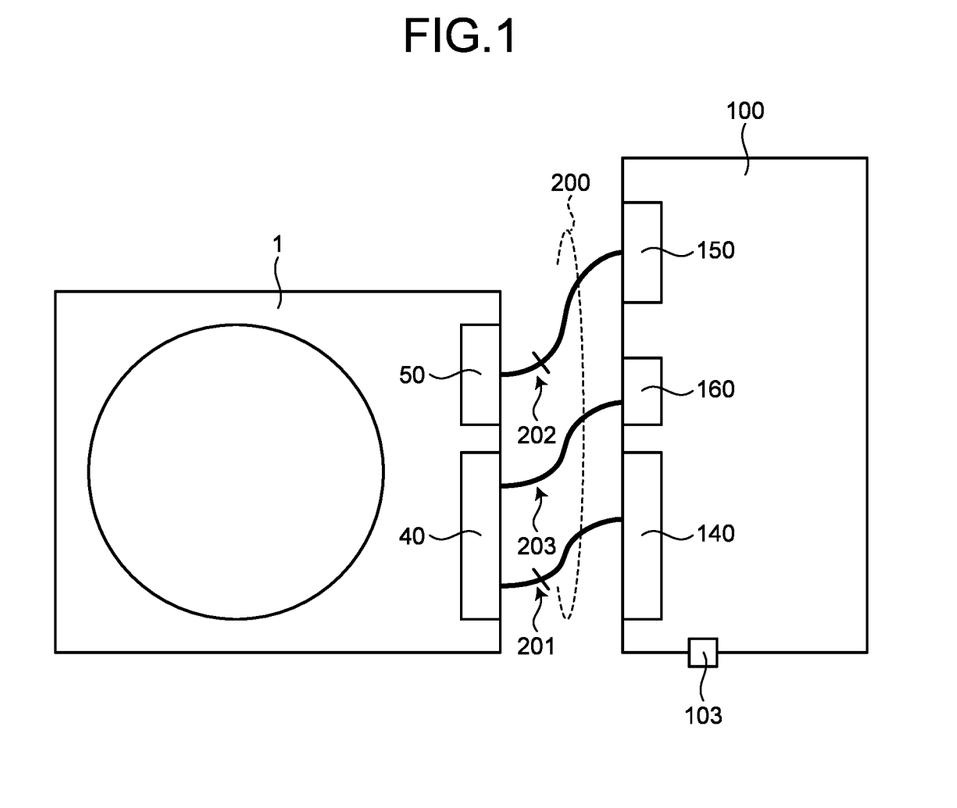
FIG. 1 is a diagram illustrating a schematic configuration of a disk device according to an embodiment.

As illustrated in FIG. 1, a disk device 1 is connectable to a host 100 via a communication medium 200, and may function as a storage medium for the host 100 when connected. FIG. 1 is a diagram illustrating a schematic configuration of a disk device. The communication medium 200 may be a wire communication path or may be a serial communication path. The communication medium 200 may include a communication line group 201, a communication line group 202, and a communication line 203. The communication line group 201 is mainly used for power transmission, and includes a plurality of power lines. The communication line group 202 is mainly used for data transmission, and includes a plurality of data lines. The disk device 1 may perform half-duplex bidirectional communication with the host 100 via each communication line of the communication line group 202. The disk device 1 may perform half-duplex bidirectional communication with the host 100 via the communication line 203.

The disk device 1 includes a power connector 40 and a data connector 50. The power connector 40 and the data connector 50 may comply with the Serial Advanced Technology Attachment (SATA) standard, or may comply with the Serial Advanced SCSI (SAS) standard. Hereinafter, a case where the power connector 40 and the data connector 50 comply with the SATA standard will be exemplified.

The power connector 40 may connect to a power connector 140 of the host 100 via the communication line group 201. The data connector 50 may connect to a data connector 150 of the host 100 via the communication line group 202. Furthermore, the power connector 40 may connect to a connector 160 of the host 100 via the communication line 203. In the host 100, the power connector 140 and the data connector 150 may comply with the SATA standard. The host 100 may include the connector 160 without being subject to the restriction of the SATA standard.

The disk device 1 receives power supply from the host 100 using the power connector 40 via the communication line group 201. The disk device 1 operates using power. The disk device 1 may receive command data from the host 100 using the data connector 50 via the communication line group 202. If the disk device 1 receives a command, the disk device 1 performs a predetermined operation in accordance with the command. The command may include an access command. In addition, the disk device 1 may transmit a response to the command from the data connector 50 to the host 100 via the communication line group 202.

The data connector 50 includes a data pin. The data pin may receive command data from the host 100.

The power connector 40 mainly includes a power pin, but also includes a control pin that may electrically connect to a light emitting device 103. The control pin may be used for light emission control of the light emitting device 103. Furthermore, the control pin may be used for spin-up control. The control pin is connected to the light emitting device 103 of the host 100 via the communication line group 201, and the power connector 140 of the host 100. The light emitting device 103 may be a light emission diode (LED), for example.

The disk device 1 may detect a start condition of spin-up via the control pin. The disk device 1 may light up or light out the light emitting device 103 via the control pin, a communication line of the communication line group 201, and the power connector 140 in accordance with a busy/ready state of communication executed via the data connector 50. Furthermore, the disk device 1 may transfer predetermined information to a host controller 101 (refer to FIG. 2) of the host 100 via the control pin, the communication line 203, and the connector 160.

Figure 2:
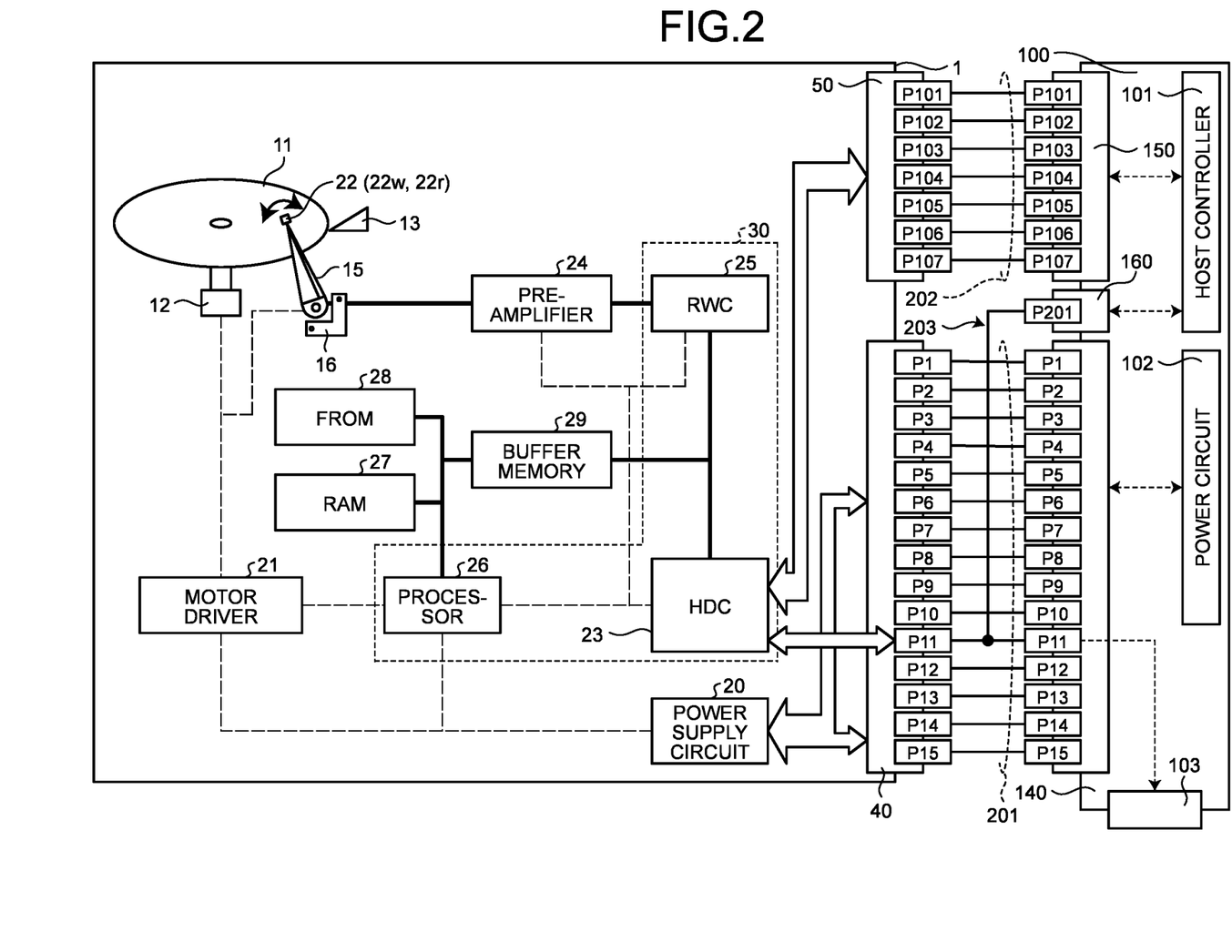
FIG. 2 is a block diagram illustrating a configuration of the disk device according to an embodiment.

The disk device 1 may have a configuration as illustrated in FIG. 2. FIG. 2 is a diagram illustrating a configuration of the disk device 1.

The disk device 1 includes one or more disks 11. For the sake of simplification, FIG. 2 illustrates one disk 11. The disk device 1 accesses the disk 11 in accordance with an access command. The access command includes a write command and a read command. The disk device 1 writes data into the disk 11 in accordance with the write command. The disk device 1 reads data from the disk 11 in accordance with the read command.

In addition to the power connector 40, the data connector 50, the disk 11, and a head 22, the disk device 1 includes a spindle motor 12, a lamp 13, an actuator arm 15, a voice coil motor (VCM) 16, a power supply circuit 20, a motor driver 21, a hard disk controller (HDC) 23, a preamplifier 24, a read/write channel (RWC) 25, a processor 26, a random access memory (RAM) 27, a flash read only memory (FROM) 28, and a buffer memory 29.

Note that a configuration including the HDC 23, the RWC 25, and the processor 26 can be regarded as a controller 30. The controller 30 may include a system-on-chip. The controller 30 may include another component such as the RAM 27, the FROM 28, or the buffer memory 29.

The power supply circuit 20 distributes power supplied from a power source 41, to each component of the disk device 1. The power supply circuit 20 may perform voltage conversion in accordance with a power supply destination.

The spindle motor 12 rotates the disk 11 about a rotational axis at a predetermined rotational speed.

The head 22 executes access to the disk 11 using a write head 22w and a read head 22r included in the head 22. The write head 22w writes data into the disk 11. The read head 22r reads data from the disk 11. The head 22 is attached to the leading end of the actuator arm 15. The head 22 is moved by the VCM 16 along a radial direction of the disk 11. When the rotation of the disk 11 is stopped, or the like, the head 22 is moved onto the lamp 13.

When data is read from the disk 11, the preamplifier 24 amplifies a signal read from the disk 11, outputs the signal, and supplies the signal to the RWC 25. In addition, the preamplifier 24 amplifies a signal corresponding to write target data supplied from the RWC 25, and supplies the signal to the head 22.

The HDC 23 performs control of data transmission/reception performed with the host 100 via an I/F bus 2, control of the buffer memory 29, and error correction processing or read data.

The buffer memory 29 is a buffer memory provided for absorbing a difference between an access speed between the host 100 and the disk device 1, and an access speed to the disk 11.

The buffer memory 29 includes a volatile memory that enables a high-speed operation, for example. The type of a memory included in the buffer memory 29 is not limited to a specific type. The buffer memory 29 can include, for example, a dynamic random access memory (DRAM), a static random access memory (SRAM), or a combination of these.

The RWC 25 performs code modulation of write target data supplied from the HDC 23, and supplies the write target data to the preamplifier 24. In addition, the RWC 25 performs code demodulation of a signal read from the disk 11 and supplied from the preamplifier 24, and outputs the signal to the HDC 23 as digital data.

The processor 26 is a processing unit such as a central processing unit (CPU) or a digital signal processor (DSP). The processor 26 may include two or more processing units. The RAM 27, the flash read only memory (FROM) 28, and the buffer memory 29 are connected to the processor 26.

The RAM 27 includes, for example, a DRAM, an SRAM, or a combination of these. The RAM 27 is used by the processor 26 as an operation memory. For example, the RAM 27 is used as a region onto which a firmware program is to be loaded, or a region in which various types of management data are held.

The FROM 28 is a nonvolatile memory. In accordance with firmware programs prestored in the FROM 28 and the disk 11, the processor 26 performs overall control of the disk device 1. The processor 26 loads firmware programs prestored in the FROM 28 and the disk 11, onto the RAM 27, and executes control of the motor driver 21, the preamplifier 24, the RWC 25, the HDC 23, and the like in accordance with the loaded firmware programs.

The motor driver 21 drives the VCM 16 and the spindle motor 12. The VCM 16 is driven by a drive voltage applied from the motor driver 21, and accelerates or decelerates a movement speed of the head 22.

The power connector 40 is connected to the power connector 140 of the host 100 via the communication line group 201. The host 100 includes a power circuit 102 in addition to the power connector 140. The power supply circuit 20 may receive a source voltage from the power circuit 102 via the power connector 140, the communication line group 201, and the power connector 40. Furthermore, the power connector 40 is connected to the connector 160 of the host 100 via the communication line 203. The host 100 includes the host controller 101 in addition to the power connector 140, the data connector 150, the connector 160, the power circuit 102, and the light emitting device 103.

The power connector 40 includes a plurality of pins P1 to P15. The plurality of pins P1 to P15 corresponds to a plurality of pins P1 to P15 in the power connector 140. Each of the pins P1 to P15 is connected to a corresponding pin P in the power connector 140.

Furthermore, the pin P11 is connected to a pin P201 in the connector 160 via the communication line 203. The controller 30 may communicate predetermined information with the host 100 via the pin P11. The controller 30 may receive predetermined information from the host controller 101 via the pin P201, the communication line 203, and the pin P11. The controller 30 may transmit predetermined information to the host controller 101 via the pin P11, the communication line 203, and the pin P201.

Figure 3A:
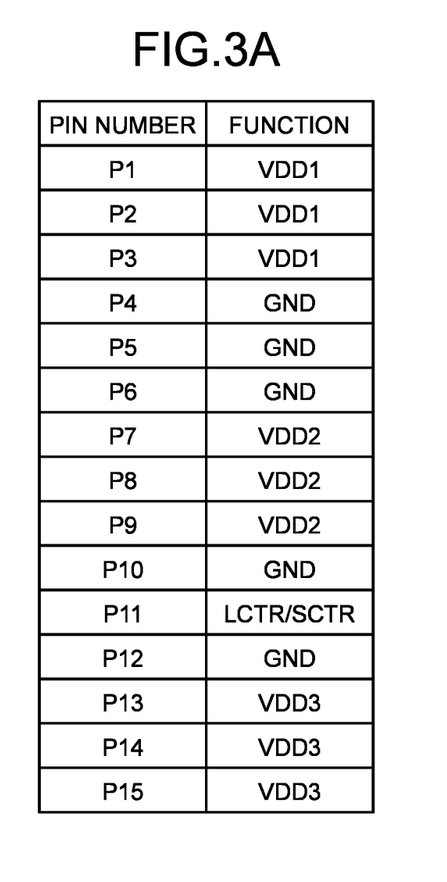
FIGS. 3A and 3B are diagrams illustrating a configuration of a power connector and a data connector according to an embodiment.

Functions as illustrated in FIG. 3A are allocated to the plurality of pins P1 to P15. FIG. 3A is a diagram illustrating a configuration of the power connector 40.

The pins P1, P2, and P3 are allocated to power pins for receiving a source voltage VDD1. The source voltage VDD1 has 3.3 V, for example.

The pins P4 and P5 are allocated to power pins for receiving a ground potential GND.

The pins P7, P8, and P9 are allocated to power pins for receiving a source voltage VDD2. The source voltage VDD2 has a voltage different from the source voltage VDD1. The source voltage VDD2 has 5 V, for example.

The pin P10 is allocated to a power pin for receiving the ground potential GND.

The pin P11 is allocated to a control pin for light emission control (LCTR) of the light emitting device 103, and spin-up control (SCTR) at the time of activation. The pin P11 is also called an eleventh pin. The details of the pin P11 will be described later.

The pin P12 is allocated to a power pin for receiving the ground potential GND. The pins P13, P14, and P15 are allocated to power pins for receiving a source voltage VDD3. The source voltage VDD3 has a voltage different from the source voltage VDD1, and has a voltage different from the source voltage VDD2. The source voltage VDD3 has 12 V, for example.

The data connector 50 illustrated in FIG. 2 is connected to the data connector 150 of the host 100 via the communication line group 202. The controller 30 may receive command data from the host controller 101 via the data connector 150, the communication line group 202, and the data connector 50. The controller 30 may transmit command response data to the host controller 101 via the data connector 50, the communication line group 202, and the data connector 150.

The data connector 50 includes a plurality of pins P101 to P107. The plurality of pins P101 to P107 corresponds to a plurality of pins P101 to P107 in the data connector 150. Each of the pins P101 to P107 is connected to a corresponding pin P in the data connector 150.

Figure 3B:
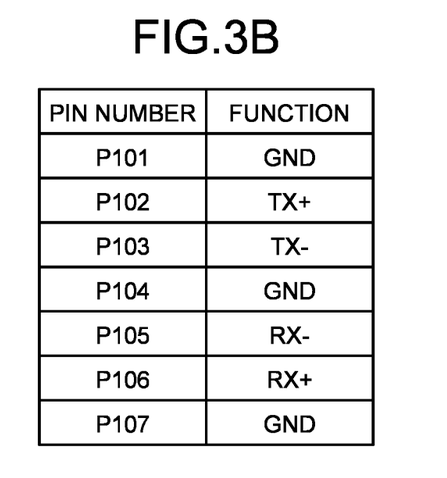

Functions as illustrated in FIG. 3B are allocated to the plurality of pins P101 to P107. FIG. 3B is a diagram illustrating a configuration of the data connector 50.

The pin P101 is allocated to a power pin for receiving the ground potential GND.

The pins P102 and 103 are allocated to data pins for outputting transmission differential signals TX+ and TX−.

The pin P104 is allocated to a power pin for receiving the ground potential GND.

The pins P105 and 106 are allocated to data pins for receiving reception differential signals RX+ and RX−.

The pin P107 is allocated to a power pin for receiving the ground potential GND.

Note that the controller 30 may perform communication with the host 100 via a control pin (for example, pin P11) of the power connector 40 at lower speed as compared with communication via a data pin (for example, pin P102, P103, P105, or P106) of the data connector 50. Because the size of information (for example, state information to be described later) to be transmitted by communication with the host 100 via a control pin of the power connector 40 is smaller as compared with the size of information to be transmitted by communication via a data pin of the data connector 50, the controller 30 may perform communication with the host 100 via the control pin of the power connector 40 at lower speed.

Figure 4:
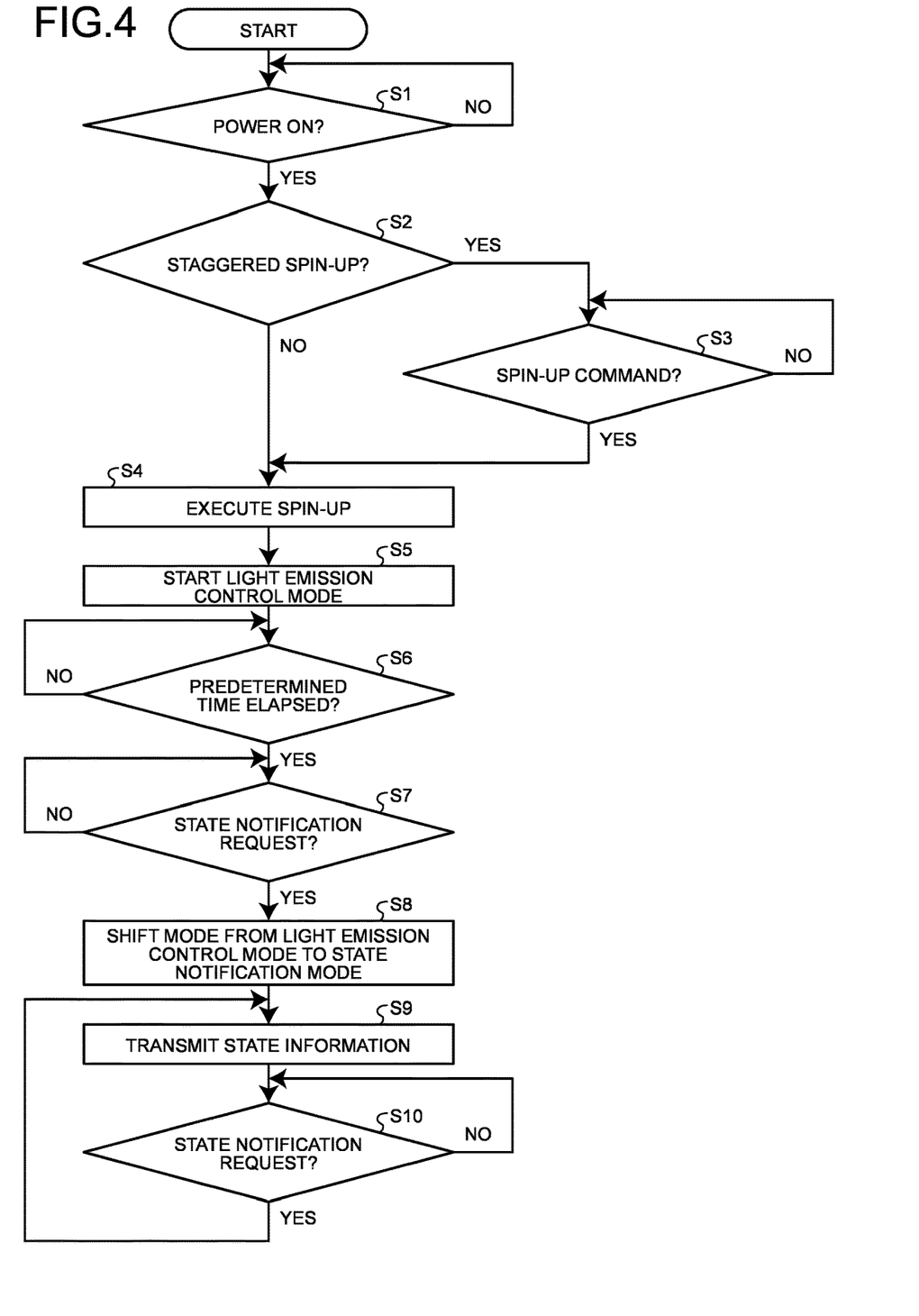
FIG. 4 is a flowchart illustrating an operation of the disk device according to an embodiment.

Next, an operation of the disk device 1 will be described using FIG. 4. FIG. 4 is a flowchart illustrating an operation of the disk device 1.

In the disk device 1, the controller 30 sets a control mode of a control pin of the power connector 40 to a light emission control mode.

The controller 30 waits until a source voltage is received via a power pin (for example, pins P1 to P3, P7 to P9, P13 to P15) of the power connector 40 (No in S1). If a source voltage is received via a power pin of the power connector 40, the controller 30 checks a level of a control pin (for example, pin P11) of the power connector 40, and determines whether or not the disk device 1 supports staggered spin-up (S2).

If the level of the control pin of the power connector 40 is an H level, the controller 30 determines that the disk device 1 supports staggered spin-up (Yes in S2), and waits until a spin-up command is received from the host 100 (No in S3). If a spin-up command is received via a data pin (for example, pin P105 or P106) of the data connector 50 (Yes in S3), the controller 30 activates the spindle motor 12 and performs spin-up (S4).

If the level of the control pin of the power connector 40 is an L level, the controller 30 determines that the disk device 1 does not support staggered spin-up (No in S2), and activates the spindle motor 12 and performs spin-up without waiting (S4).

If spin-up is performed, the controller 30 enters a state in which communication with the host 100 via the data connector 50 is executable. At the same time, the controller 30 starts the light emission control mode as a control mode of the control pin of the power connector 40 (S5).

In the light emission control mode, if communication executed via the data connector 50 is in a busy state, the controller 30 performs light emission control of lighting up the light emitting device 103. The controller 30 supplies a control signal for issuing a light-up instruction, to the light emitting device 103 via a control pin (for example, pin P11) of the power connector 40, a communication line, and a control pin (for example, pin P11) of the power connector 140. The light emitting device 103 lights up in accordance with the control signal for issuing a light-up instruction. If communication executed via the data connector 50 is in a ready state, the controller 30 performs light emission control of lighting out the light emitting device 103. The controller 30 supplies a control signal for issuing a light-out instruction, to the light emitting device 103 via a control pin (for example, pin P11), a communication line, and a control pin (for example, pin P11). The light emitting device 103 lights out in accordance with the control signal for issuing a light-out instruction.

Note that the busy state includes not only a state in which signal transmission is continued, but also a state in which a start signal of a communication unit (for example, packet) has been received and an end signal thereof has not been received even if signal transmission is intermittent. The ready state includes a state in which signal transmission is not performed and a start signal of a communication unit has not been received yet, and a state in which transmission is not performed and an end signal of a communication unit has already been received.

The controller 30 waits until a predetermined time elapses from spin-up (No in S6). If the predetermined time elapses from spin-up (Yes in S6), the controller 30 enters a state in which a state notification request from the host 100 may be received via a control pin (for example, pin P11) of the power connector 40. The state notification request may be defined as a predetermined signal pattern. If a signal to be received via a control pin (for example, pin P11) of the power connector 40 matches a predetermined signal pattern, the controller 30 may determine that a state notification request has been received, and if the signal does not match the predetermined signal pattern, the controller 30 may determine that a state notification request has not been received.

The controller 30 continues the light emission control of the light emitting device 103 using a control pin (for example, pin P11) of the power connector 40 until a state notification request is received from the host 100 (No in S7).

If a state notification request is received from the host 100 (Yes in S7), the controller 30 stops the light emission control of the light emitting device 103 in accordance with the state notification request, and stops outputting a control signal for issuing a light-up/light-out instruction, to a control pin (for example, pin P11) of the power connector 40. The controller 30 shifts a control mode of a control pin of the power connector 40 from the light emission control mode to a state notification mode (S8). In parallel with this, the controller 30 acquires state information regarding a state of the disk device 1, in accordance with the state notification request. The controller 30 outputs the state information to a control pin (for example, pin P11) of the power connector 40, and transmits the state information to the host 100 (S9). The controller 30 may transmit the state information to the host controller 101 via a control pin (for example, pin P11) of the power connector 40->the communication line 203->a data pin (for example, pin P201) of the connector 160.

The state information may include any information regarding the state of the disk device 1. For example, the state information may include information indicating normality/abnormality of the disk device 1, information indicating an operation history of the disk device 1, information indicating an operation environment of the disk device 1, and the like.

The information indicating normality/abnormality of the disk device 1 may include at least one of the presence or absence of a communication error via the data connector 50, a frequency of a communication error via the data connector 50, a duration time of a busy state of communication via the data connector 50, a frequency of a write error of the disk 11, a frequency of a read error of the disk 11, and the like.

In addition, the information indicating normality/abnormality of the disk device 1 may include a determination result of normality/abnormality obtained in the disk device 1. For example, the controller 30 may hold an allowable range corresponding to a normal state, as for a parameter regarding the state of the disk device 1, and determine whether nor not the parameter falls within the allowable range. If the parameter falls within the allowable range, the controller 30 determines that the disk device 1 is normal, and if the parameter falls outside the allowable range, the controller 30 determines that the disk device 1 is abnormal. The controller 30 may include a determination result in the state information.

The information indicating an operation history of the disk device 1 may include at least one of a history of command responses transmitted to or received from the host 100 via the data connector 50, a history of write access and read access to the disk 11, a history of commands generated by the controller 30 through various types of data processing, and the like.

The information indicating an operation environment of the disk device 1 may include at least one of a temperature of the disk device 1, a source voltage of the disk device 1, an operation voltage of the disk device 1, an operation frequency of the disk device 1, stress, acceleration, and vibration to be received by the disk device 1, and the like.

The controller 30 waits until a state notification request is received from the host 100 (No in S10). If a state notification request is received from the host 100 (Yes in S10), the controller 30 acquires the state information, and performs processing in S9 again.

Note that, in the operation illustrated in FIG. 4, if a control mode of a control pin of the power connector 40 switches to the state notification mode in S8, the state notification mode does not switch to the light emission control mode afterward. When the power of the controller 30 is turned off, the control mode of a control pin of the power connector 40 may be switched from the state notification mode to the light emission control mode, which is not illustrated in the drawing. Alternatively, when the power of the controller 30 is turned on, the control mode of a control pin of the power connector 40 may be switched from the state notification mode to the light emission control mode, which is also not illustrated in the drawing.

As described above, in an embodiment, in the disk device 1, the controller 30 may receive a state notification request via a control pin (for example, pin P11) of the power connector 40. The controller 30 may transmit state information corresponding to the state notification request, to the host 100 via a control pin of the power connector 40. With this operation, because state information request reception and state information notification may be performed by communication via the power connector 40 concurrently with communication executed via the data connector 50, it is possible to efficiently notify the host 100 of state information.

For example, in some cases, state information request reception and state information notification are performed via the data connector 50. In some cases, the disk device 1 receives a self-monitoring analysis and reporting technology (SMART) command from the host 100 via the data connector 50. In this case, in a command queue (Native Command Queuing: NCQ) of the disk device 1, processing of the SMART command is prioritized, and processing of a read command and/or a write command is laid over. Accordingly, a command processing time of read and/or write in the disk device 1 might become a long time, and the efficiency of command processing regarding data access might decline.

To cope with this, in an embodiment, in the disk device 1, state information request reception and state information notification may be performed by communication via the power connector 40 concurrently with communication executed via the data connector 50. Thus, it is possible to implement state information request reception and state information notification while shortening a command processing time of read/write, and efficiently notify the host 100 of state information.

In addition, in a case where state information request reception and state information notification are performed via the data connector 50, while a phenomenon in which communication via the data connector 50 stays in the busy state for a long time is continued, state information request reception and state information notification is difficult to be performed. Thus, because the host 100 is difficult to acquire state information and the state of the disk device 1 is difficult to be identified while the phenomenon is continued, it becomes difficult to search for a cause of the phenomenon.

To cope with this, in an embodiment, in the disk device 1, state information request reception and state information notification may be performed by communication via the power connector 40 concurrently with communication executed via the data connector 50. Thus, while the phenomenon in which communication via the data connector 50 stays in the busy state for a long time is continued, the disk device 1 may receive a state information request from the host 100 and issue a state information notification to the host 100. Thus, because the host 100 may acquire state information and the state of the disk device 1 may be identified while the phenomenon is continued, it becomes easier to search for a cause of the phenomenon.

For example, in a case where the disk device 1 is in a standby state such as a state of waiting for data entry from the host 100, due to a communication error of an SATA interface (for example, the HDC 23, etc.), or the like, the disk device 1 may receive a state information request from the host 100 and issue a state information notification to the host 100. With this operation, if the host 100 may recognize the state of the disk device 1, the host 100 may issue a reset suspension instruction "SATA IF Reset" without waiting until a response in communication is determined to have timed out. If the reset suspension instruction has been issued, the host 100 and/or the disk device 1 reset(s) communication processing, and perform(s) error recovery processing such as retransmission of data. With this operation, time shortening of error recovery processing may be expected. In addition, corresponding processing may be always added to the host 100 side. With this operation, communication reliability and maintainability may be enhanced.

In addition, in a case where a connector for state notification is added to the disk device 1, in addition to the cost of the connector itself, cost of a configuration change of the disk device 1 and component addition is incurred, and the cost of the disk device 1 might increase.

To cope with this, in an embodiment, in the disk device 1, state information request reception and state information notification are performed using an existing control pin (for example, pin P11) in the power connector 40. With this operation, it is possible to implement state information request reception and state information notification while suppressing a cost increase in the disk device 1.

Figure 5:
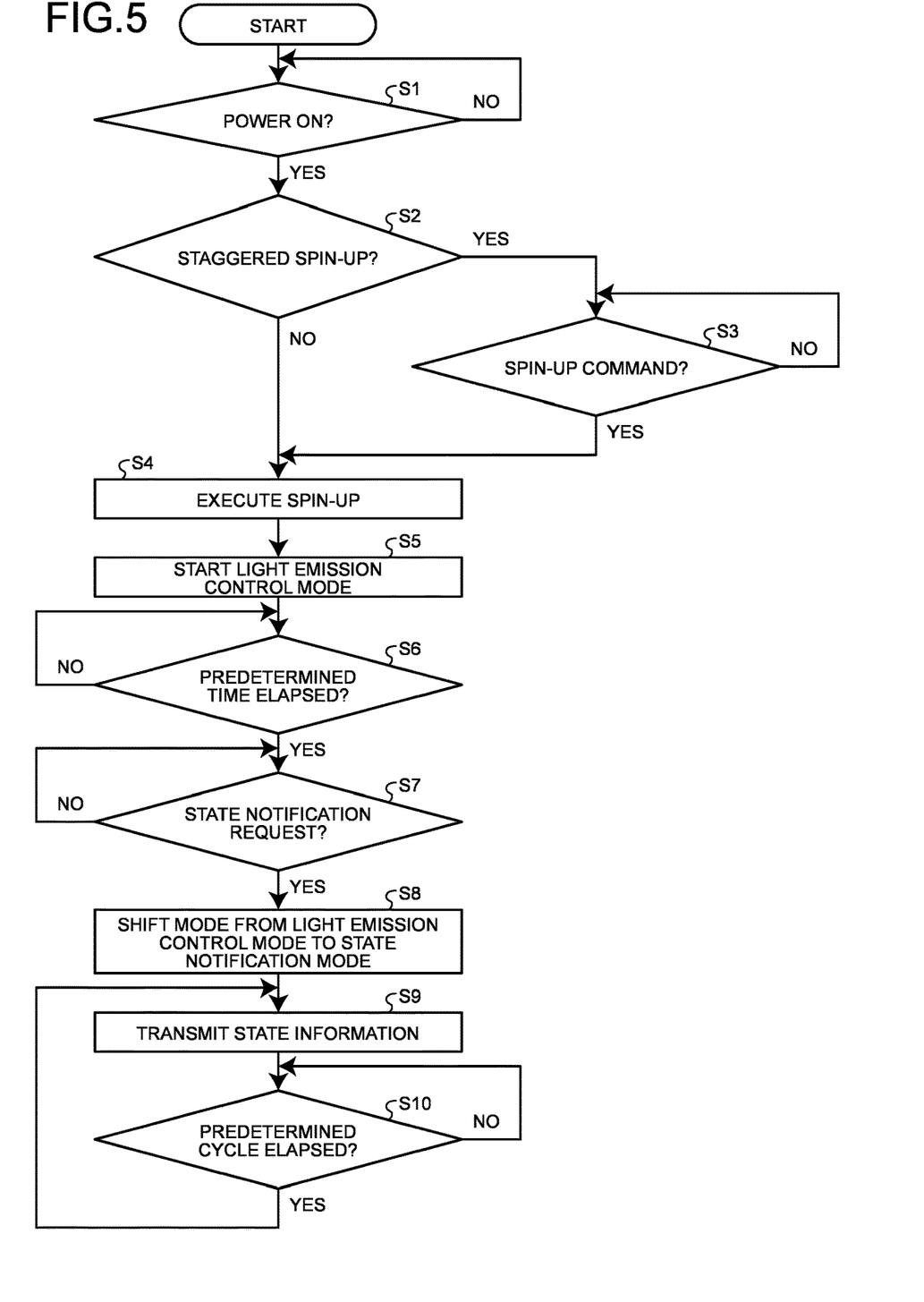
FIG. 5 is a flowchart illustrating an operation of a disk device according to a modified example of an embodiment.

In addition, as a modified example of an embodiment, in the disk device 1, the transmission of state information may be executed at a predetermined cycle without waiting for a state notification request from the host 100. For example, the disk device 1 may perform an operation illustrated in FIG. 5, in place of the operation illustrated in FIG. 4. FIG. 5 is a flowchart illustrating an operation of a disk device 1 according to a modified example of an embodiment.

If the controller 30 transmits state information to the host 100 via a control pin (for example, pin P11) of the power connector 40 (S9), the controller 30 waits until a predetermined cycle elapses (No in S10). If the predetermined cycle elapses (Yes in S10), the controller 30 acquires the state information, and performs processing in S9 again. The predetermined cycle may be predetermined experimentally.

With this operation, in a case where the host 100 has failed to receive state information at the predetermined cycle, the host 100 may determine that a trouble has occurred in the disk device 1, and may recognize abnormality occurrence of the disk device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a first connector that is connectable to a host, and includes a first pin that is electrically connectable to a light emitting device in the host;
a second connector that is connectable to the host, and includes a second pin that is receivable with data from the host; and
a controller that is communicable with predetermined information with the host via the first pin.

2. The disk device according to claim 1,
wherein, in a first mode, the controller performs light emission control of the light emitting device via the first pin, and in a second mode, the controller is transmittable with information regarding a state of the disk device, to the host via the first pin.

3. The disk device according to claim 2,
wherein, in the first mode, the controller continues light emission control of the light emitting device until a request is received, and in accordance with reception of the request, stops light emission control of the light emitting device and switches from the first mode to the second mode.

4. The disk device according to claim 3,
wherein the state information includes at least one of information indicating normality/abnormality of the disk device, information indicating an operation history of the disk device, and information indicating an operation environment of the disk device.

5. The disk device according to claim 3,
wherein, when a power of the disk device is turned off, the controller switches from the second mode to the first mode.

6. The disk device according to claim 3,
wherein, when a power of the disk device is turned on, the controller switches from the second mode to the first mode.

7. The disk device according to claim 2,
wherein the controller activates a spindle motor and performs spin-up in accordance with a level of the first pin at a time of activation of the disk device, and starts the first mode in accordance with the spin-up.

8. The disk device according to claim 3, further comprising
a disk,
wherein, in the second mode, the controller outputs state information regarding a state of the disk device, to the first pin in accordance with the request.

9. The disk device according to claim 2,
wherein, in the first mode, the controller continues light emission control of the light emitting device until a duration time of the light emission control reaches a predetermined time, and in accordance with the duration time reaching the predetermined time, stops the light emission control and switches from the first mode to the second mode.

10. The disk device according to claim 9, further comprising
a disk,
wherein, in the second mode, the controller outputs state information regarding a state of the disk device, to the first pin at a predetermined cycle.

11. The disk device according to claim 10,
wherein the state information includes at least one of information indicating normality/abnormality of disk device, information indicating an operation history of the disk device, and information indicating an operation environment of the disk device.

12. The disk device according to claim 9,
wherein, when a power of the disk device is turned off, the controller switches from the second mode to the first mode.

13. The disk device according to claim 9,
wherein, when a power of the disk device is turned on, the controller switches from the second mode to the first mode.

14. The disk device according to claim 1,
wherein the controller detects a start condition of spin-up via the first pin at a time of activation of the disk device.

15. The disk device according to claim 14,
wherein, if the first pin is at a first level at a time of activation of the disk device, the controller waits until a spin-up command is received, and in accordance with reception of the spin-up command, activates a spindle motor and performs spin-up.

16. The disk device according to claim 15,
wherein, if the first pin is at a second level at a time of activation of the disk device, the controller activates the spindle motor and performs spin-up without waiting.

17. The disk device according to claim 1,
wherein the first connector is a power connector, and
the second connector is a data connector.

18. The disk device according to claim 1,
wherein the first connector corresponds to a power connector complying with a Serial Advanced Technology Attachment (SATA) standard,
the second connector corresponds to a data connector complying with the SATA standard, and
the first pin corresponds to an eleventh pin of the power connector.

19. The disk device according to claim 1,
wherein the controller is communicable with the predetermined information with the host via the first pin while continuing communication via the second connector.

20. The disk device according to claim 1,
wherein the controller performs communication via the second connector at a first speed, and performs communication via the first pin at a second speed slower than the first speed.

* * * * *